United States Patent [19]

Dizon

[11] 4,111,189
[45] Sep. 5, 1978

[54] COMBINED SOLAR RADIATION COLLECTOR AND THERMAL ENERGY STORAGE DEVICE

[75] Inventor: Edwin S. Dizon, Willingboro, N.J.

[73] Assignee: Cities Service Company, Tulsa, Okla.

[21] Appl. No.: 756,230

[22] Filed: Jan. 3, 1977

[51] Int. Cl.² ............................................. F24H 7/00
[52] U.S. Cl. ................................... 126/400; 126/270; 126/271; 165/104 S; 252/73
[58] Field of Search .................. 165/DIG. 4, 104 S; 252/73; 126/400, 270, 271; 237/1 A

[56] References Cited

U.S. PATENT DOCUMENTS

| | | | |
|---|---|---|---|
| 2,726,211 | 12/1955 | Schaefer | 126/400 |
| 3,968,786 | 7/1976 | Spielberg | 126/271 |
| 3,989,927 | 11/1976 | Erb | 126/400 |
| 3,996,919 | 12/1976 | Hepp | 126/400 |
| 4,003,426 | 1/1977 | Best et al. | 165/104 S |
| 4,034,569 | 7/1977 | Tchernev | 252/67 |

Primary Examiner—J. J. Camby
Assistant Examiner—Larry I. Schwartz
Attorney, Agent, or Firm—Donald L. Traut

[57] ABSTRACT

A solar energy device for collecting solar radiation, converting the radiation to thermal energy and storing the thermal energy, and a process for manufacturing of same.

30 Claims, 3 Drawing Figures

COMBINED SOLAR RADIATION COLLECTOR AND THERMAL ENERGY STORAGE DEVICE

BACKGROUND OF THE INVENTION

1. Field of the Invention

This invention is related to a solar radiation collection device. More particularly, this invention provides a device and a process for manufacturing the device which collects solar radiation, converts the solar radiation to thermal energy, and stores the thermal energy in a single, relatively lightweight component.

2. Description of the Prior Art

Conventional solar radiation collectors typically collect solar radiation and convert that radiation to thermal energy. The thermal energy is then transferred via a primary absorbing medium to a thermal energy storage device. From the thermal energy storage device, the thermal energy is transferred as needed to the household via a secondary heat absorbing medium. Conventional thermal energy storage devices typically store the heat by the heating of materials, such as water or rocks, in order to utilize the sensible heat of same, or by the melting of a phase change material in order to make use of the latent heat of fusion of the phase change material.

A phase change material defines any solid material which melts endothermally to produce a liquid, and reversibly and exothermally recrystallizes in order to release the previously absorbed thermal energy. The phase change materials presently available, however, do not meet the criteria of reversibility in absorption and release of thermal energy. One means of achieving some reversibility has been to encapsulate small quantities of a phase change material. The process of microencapsulation, however, is very expensive.

SUMMARY OF THE INVENTION

It is therefore an object of this invention to provide a device for collecting solar radiation, converting the solar radiation to thermal energy, and storing the thermal energy within a single device.

It is another object of this invention to provide a device which utilizes the latent heat of fusion of a phase change material for storage of thermal energy.

It is another object of this invention to provide a process for the manufacture of a device for the collection of solar radiation, conversion of the radiation to thermal energy, and the storage of the thermal energy, making use of the latent heat of fusion of a phase change material.

Still other objects will be apparent to those skilled in the art in the following description of this invention.

The foregoing objects are achieved according to the practice of this invention. Broadly, this invention comprises a device for the collection of solar radiation and the storage of thermal energy including a housing reservoir and a phase change matrix disposed in the housing reservoir. The phase change matrix comprises a polymeric material and a particulate phase change material. The particulate phase change material, having a melting point below about 100° C., is discretely dispersed in the polymeric material. A heat exchange means is positioned within the matrix for moving a heat absorbing medium therethrough and is in communication with the outside of the reservoir.

The invention also broadly comprises a process for manufacturing the device including: pulverizing a phase change material into a finely particulate state, the phase change material having a melting point lower than about 100° C.; mixing the particulate phase change material with a polymeric material to form a phase change matrix, and simultaneously maintaining the temperature of mixing below the melting point of the phase change material, in order that the particulate particles of the phase change material may be discretely dispersed in the polymeric material and prevented from liquifying and coagulating.

BRIEF DESCRIPTION OF THE DRAWING

Other features and advantages of the present invention will become apparent from an examination of the following specifications when read in connection with the appended drawings, in which.

DETAILED DESCRIPTION OF THE INVENTION

Figure 1:
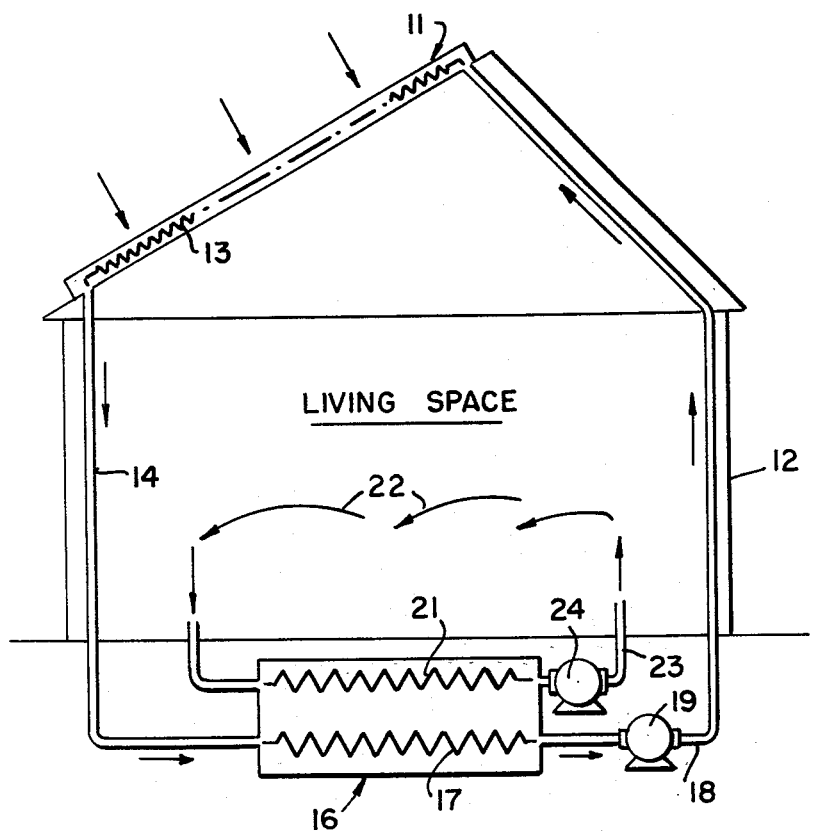
FIG. 1 is a schematic illustration showing the prior art of solar radiation collection and thermal energy storage system.

Referring now in detail to the drawings, wherein similar parts of the invention are represented by like reference numerals, FIG. 1 illustrates the prior art of a system for solar radiation collection and thermal energy storage, in which a solar radiation collector, generally illustrated as 11, comprises a black body material, such as a surface coated with black paint or a surface made up of anodized metal. The collector 11 is mounted upon a house, generally illustrated by 12, absorbs solar radiation, and converts the radiation into thermal energy. A primary heat absorbing medium is circulated through a first heat exchange means 13 within the collector 11 to absorb the converted thermal energy. The primary heat absorbing medium is then transported by conduit means 14 to a thermal energy storage bin, generally illustrated by 16, wherein the thermal energy is subsequently conducted through a second heat exchange means 17 to a heat storage material such as water, rock, or phase change material (not shown in the drawing) situated within storage bin 16. Water or rocks, as a heat storage material, utilize the sensible heat of storage of the water or rocks. The phase change storage material utilizes the latent heat of fusion of the phase change material for heat storage. After the heat is transferred to the storage bin 16, the cooled primary heat absorbing medium is transported from the thermal energy storage bin 16 via conduit means 18 to the collector 11 by a primary pump or blower 19.

As needed within the house 12, a secondary heat absorbing medium is circulated through a third heat exchange means 21 positioned within the thermal energy storage bin 16 to absorb the stored thermal energy. The secondary heat absorbing medium transports the thermal energy from the storage bin 16 to a heat distribution means 22 via conduit means 23 by a secondary pump or blower 24. The heat distribution means 22 is positioned within the house 12 so as to optimize the heating thereof.

The primary and secondary heat absorbing mediums may be water, air, or other fluids. The type of fluid determines the type of pump or blower 19 and 24, the type of heat exchange means 13, 17, and 21, and the type of heat distribution means 22 within the house 12.

Figure 3:
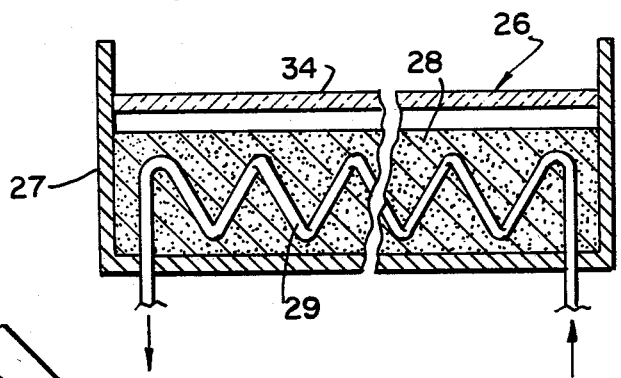
FIG. 3 is a side elevation, in section, disclosing an embodiment of the solar radiation collection and thermal energy storage device.
Figure 2:
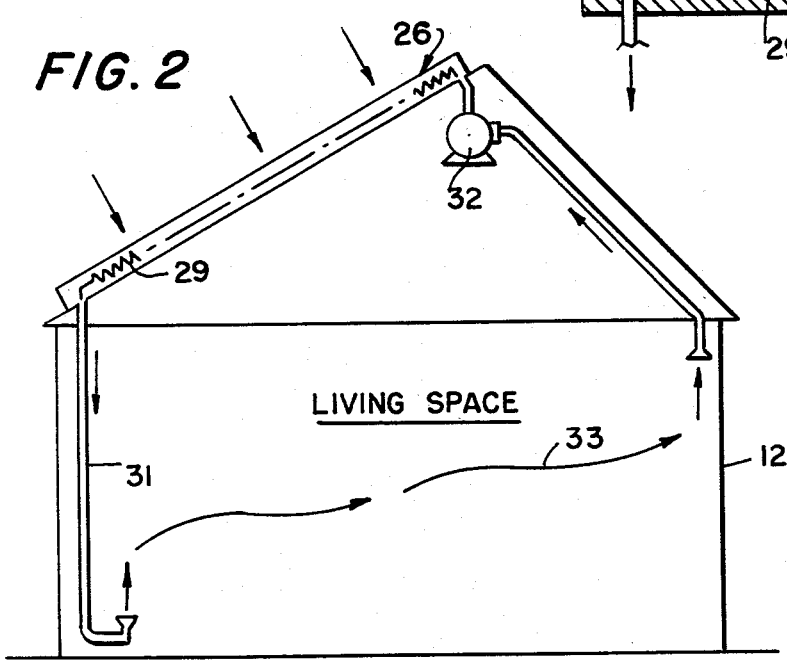
FIG. 2 is a schematic illustration showing the present invention, a combined solar radiation collection and thermal energy storage device.

Referring in particular now to FIGS. 2 and 3 which illustrate the present invention, a solar energy device, generally illustrated as 26, is mounted upon a house 12 so as to optimize the collection of solar radiation. The solar energy device 26 comprises a housing reservoir 27, and a phase change matrix 28. The matrix 28 includes a polymeric material and a particulate phase change material. The particulate phase change material is discretely dispersed in the polymeric material. The phase change material is any solid material which melts endothermally to produce a liquid and reversibly and exothermally recrystallizes, thereby releasing the previously absorbed thermal energy. The solar radiation strikes the surface of the solar energy device 26 and is converted to thermal energy. The converted solar radiation, in the form of thermal energy, is stored in matrix 28 by the melting of the phase change material. A heat exchange means 29 is positioned within the phase change matrix 28. The thermal energy, when needed within the household, is removed by a heat absorbing medium circulated through the heat exchange means 29 situated within the solar energy device 26 and transported through a conduit means 31 by a pump or blower 32 to a heat distribution means 33 positioned in the house 12. Thus, the thermal energy storage bin 16, heat exchange means 17 and 21, conduit means 18 and 28, the primary heat absorbing medium, and the blower or pump 24 in FIG. 1, the prior art, have been eliminated.

The phase change material of matrix 28 should have a melting point of under 100° C. Preferably the melting temperature should be from about 50° C. to about 80° C. The material should preferably have a latent heat of fusion above about 50 cal/gram so as to limit the amount of the phase change material needed for adequate storage. The material must be immiscible in polymeric materials. Preferably, the phase change material is selected from a group consisting of polyethylene glycol, tritriacontane, pentacosane, camphene, myristic acid, methyl oxalate, stearic acid, and tristearim. More preferably, the phase change material should be polyethylene glycol having a molecular weight of from about 4,500 to about 20,000. The most preferred phase change material is polyethylene glycol having a molecular weight of about 6000.

The polymeric material should have good heat transfer characteristics. It should not be miscible in the phase change material, but should be compatible with the phase change material to the extent that a fine particulate phase change material may be enclosed in small and discrete portions throughout the polymeric material. The polymeric material should preferably be resistant to degradation by solar radiation and have a melting or softening point greater than the operating temperature of the device. The preferred polymeric material is a curable polymeric liquid. More preferably, the polymeric material should be selected from a group consisting of polymeric polysulfide, the polymeric polysulfide having a formula:

$$RS_2-(RS_2)_n-SH$$

polymeric silicone rubber, the polymeric silicone rubber having a formula:

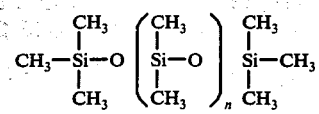

wherein $n$ is from about 500 to about 5,000, polymeric butyl rubber and other polymeric sealant rubbers well known to those possessing ordinary skill in the art. Most preferably, the polymeric material should be polymeric polysulfide, wherein R is an aliphatic having from about 2 to about 5 carbon atoms, and $n$ is an integer from about 3 to about 76. The preferred molecular weight of the polysulfide is from 600 to 7,000.

The ratio of the polymeric material to the particulate phase change material should be from about 0.4:1 to about 3:1. Preferably the ratio should be from about 0.7:1 to about 2:1. Most preferred, the ratio of the polymeric polysulfide to the polyethylene glycol is from about 1:1 to about 1.5:1.

In a preferred embodiment of the present invention, a curing agent for liquid polymeric materials should comprise from about 1 wt% to about 10 wt% of the matrix. The type of curing agent is determined by the type of polymeric material. The amount of the curing agent is generally determined by the stoichiometry of the curing reaction. For example, in curing polymeric polysulfide, having a molecular weight of 4,000, 3 wt% of powdered lead peroxide dispersed in oil may be used.

In a preferred embodiment of the invention, the exposed surface of the matrix should be coated with a paint having absorptivity greater than about 0.90. A paint containing carbon black is preferred since it has absorptivity of about 0.95 in addition to a high rate of emmissivity above about 100° C. The latter characteristic will prevent the solar collector device 26 from overheating during times when adequate amounts of heat are not withdrawn from the device 26 to the heat distribution means 33 within the house 12.

More preferably, the phase change matrix 28 is mixed with carbon black. The carbon black should be a high structure and high surface area carbon black, such as paint grade black or conductive grade black. Broadly, the phase change matrix should be from about 25 wt% to about 65 wt% of polymeric material, from about 3 wt% to about 10 wt% of carbon black and from about 20 wt% to about 60 wt% of phase change material. A more preferred composition of the phase change matrix is from about 35 wt% to about 50 wt% of polymeric material, from about 5 wt% to about 8 wt% of carbon black, and from about 40 wt% to about 50 wt% of phase change material. The most preferred composition is about 45 wt% of polymeric polysulfide, about 6 wt% of carbon black and about 45 wt% of polyethylene glycol.

In a preferred embodiment of the present invention the device additionally includes one cover plate 34. More preferably, the cover plate 34 is of a transparent material and is spacedly situated to form an air space between the cover plate 34 and the phase change matrix 28.

The heat distribution means 33 may include by way of illustration and not limitation a space heating devices, a hot water heating device or combination thereof.

The device 26, by combining the function of collection of solar radiation and storage of thermal energy into a single component, eliminates unnecessary transfers of thermal energy in addition to the additional means needed for accomplishing these transfers. The heart of the invention resides in the concept of including a phase change material capable of absorbing thermal energy and reversibly releasing that energy within a solar radiation collection device 26. The storage of thermal energy within the solar radiation collection device 26 contrasts sharply with the prior art which required the transfer of thermal energy from the collector 11 to a heat storage bin 16. The thermal energy storage bin 16 had to be located in a large insulated portion of a basement or a large insulated excavation beneath a house 12, since the prior heat storage material included water or rocks which are both heavy and inefficient as storage materials for large quantities of thermal energy.

The process for the manufacture of the device 26 to be utilized in solar radiation collection and thermal energy storage, comprises pulverizing a phase change material into a finely particulate state, the phase change material having a melting point lower than about 100° C.; and subsequently mixing the particulate phase change material with a polymeric material to form a phase change matrix 28 while simultaneously maintaining the temperature of mixing below the melting point of the phase change material. The particulate phase change material is discretely dispersed in the polymeric material and prevented from liquifying and coagulating.

The process additionally includes depositing the matrix 28 within a housing reservoir 27, positioning a heat exchange means 29 within the matrix 28, the heat exchange means 29 being in communication with the outside of the reservoir 27, and mounting the reservoir 27 on the house 12 to expose the reservoir 27 to solar radiation in order to collect the radiation, to convert the radiation to thermal energy, and to store the energy in the matrix 28. Preferably, the process additionally includes situating a heat distribution means 33 within the house 12 and circulating a heat absorbing medium through the heat exchange means 29 in the matrix 28 to absorb the stored thermal energy in order to transfer the energy to the heat distribution means 33 to heat the house 12. Most preferably, the process additionally includes positioning a cover plate over the matrix such that there is a space between the matrix and the cover plate. The preferred phase change material, polymeric material, phase change matrix composition, black paint, carbon black additive, curing agent, and cover plate as previously mentioned, are desired.

In the following is set forth examples of my invention which are given by way of illustration and not limitation. The specific concentrations, compounds, etc. set forth in this example are not to be construed to unduly limit the scope of the invention.

EXAMPLE I

Polyethylene glycol with a molecular weight of 6,000 was pulverized into a finely divided state of about mesh 20 and mixed with the following: about 54 wt% of curable liquid polymeric polysulfide, with a molecular weight of 4,000, about 3 wt% powdered lead peroxide dispersed in oil, a curing agent, and about 10 wt% of paint grade carbon black. The temperature of mixing was maintained at 40° C. and completed in 15 minutes at which time the liquid matrix was poured into a circular metallic reservoir measuring 7.5 centimeters in diameter and 6 millimeters in depth. The matrix was cured at 38° C., the curing requiring about 4 hours.

The matrix was tested by placing the housing reservoir in a suitably insulated glass covered box and exposing the matrix to solar radiation where it obtained a maximum temperature of about 78° C. after 200 minutes of exposure. The reservoir was then removed from the solar radiation and from the insulated box, and allowed to radiate the absorbed heat freely for 210 minutes until it reached a temperature of about 36° C. The results showing the absorption of the heat and the reversible desorption of the absorbed heat are given below.

TABLE A

| Time | Temperature |
|------|-------------|
| 0    | 24° C       |
| 20   | 35          |
| 35   | 44          |
| 50   | 49          |
| 65   | 52          |
| 80   | 54          |
| 95   | 55          |
| 110  | 63          |
| 125  | 68          |
| 170  | 76          |
| 200  | 77          |
| 230  | 75          |
| 245  | 66          |
| 260  | 57          |
| 275  | 51          |
| 290  | 46          |
| 305  | 46          |
| 320  | 46          |
| 335  | 46          |
| 350  | 44          |
| 365  | 43          |
| 380  | 41          |
| 395  | 38          |
| 410  | 36          |

EXAMPLE II

Repeat Example I, but vary the wt% of the polymeric polysulfide in the phase change matrix (made up of the polymeric polysulfide and the polyethylene glycol) from about 20% to about 60% in 5 wt% increments and find similar results.

EXAMPLE III

Repeat Example II, but change the polymeric polysulfide to polymeric silicone rubber having a formula:

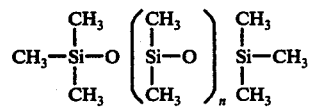

and find similar results.

EXAMPLE IV

Repeat Example I, but increase the size of the housing reservoir, fill the reservoir with the phase change matrix, and position a heat exchange means within the matrix. Position the device optimally near or upon a house in order to collect solar radiation, to convert the radiation to thermal energy and to store the energy in the matrix. Connect the heat exchange means of the device with a conduit means in communication with a heat distribution means positioned within the house. Position a pumping means in line with the conduit means and circulate a heat absorbing medium through the system, and find that the house is heated.

While the present invention has been described herein with reference to particular embodiments thereof and specific examples a latitude of modifications, various changes and substitutions are intended in foregoing disclosure and in some instances some of the features of the invention will be employed without corresponding news of other features without departing from the scope of the invention as set forth.

I claim:

1. A solar radiation collection and thermal energy storage device comprising a housing reservoir; a phase change matrix disposed in said housing reservoir, said phase change matrix comprising a polymeric material and a particulate phase change material, said phase change material being immiscible in said polymeric material, and being discretely dispersed in said polymeric material, said polymeric material being selected from a group consisting of polymeric polysulfide, polymeric silicone rubber, and polymeric butyl rubber, said phase change material is selected from a group consisting of polyethylene glycol, said polyethylene glycol having a molecular weight of from about 4500 to about 20,000, pentacasone, trituacontane, camphene, myristic acid, methyl oxalate, stearic acid, and tristearin, and said matrix includes a curing agent comprising from about 1 wt% to about 10 wt% of said matrix, and a heat exchange means being disposed in said matrix for moving a heat absorbing medium therethrough, said heat exchange means being in communication with the outside of said reservoir.

2. The device of claim 1, wherein the ratio of polymeric material to particulate phase change material is from about 0.4:1 to about 3:1.

3. The device of claim 2, wherein said ratio of polymeric material to particulate phase change material is from about 0.7:1 to about 2:1.

4. The device of claim 3, wherein said polymeric material is polymeric polysulfide; said particulate phase change material is polyethylene glycol, and the ratio of polymeric polysulfide to polyethylene glycol is from about 1:1 to about 1.5:1.

5. The device of claim 4, wherein the polyethylene glycol has a molecular weight of about 6000.

6. The device of claim 5, wherein said device is fitted with at least one transparent cover plate being spacedly situated to form an air space between said cover plate and said phase change matrix.

7. The device of claim 6, wherein the exposed surface of the phase change matrix is coated with a paint having an absorptivity greater than about 0.90.

8. The device of claim 1, wherein the phase change matrix is mixed with carbon black.

9. The device of claim 8, wherein the phase change matrix comprises from about 25 wt% to about 65 wt% of polymeric material, from about 3 wt% to about 10 wt% of carbon black, and from about 20 wt% to about 60 wt% of phase change material.

10. The device of claim 9, wherein the phase change matrix comprises from about 35 wt% to about 50 wt% of polymeric material, from about 5 wt% to about 8 wt% of carbon black, and about 40 wt% to about 50 wt% of phase change material.

11. The device of claim 10, wherein the phase change matrix comprises about 45 wt% of polymeric polysulfide, about 6 wt% of carbon black and about 45 wt% of polyethylene glycol, said polyethylene glycol having a molecular weight of from about 4500 to about 20,000.

12. The device of claim 11, wherein the polyethylene glycol has a molecular weight of about 6000.

13. The device of claim 12, wherein said device is fitted with at least one transparent cover plate being spacedly situated to form an air space between said cover plate and said phase change matrix.

14. The device of claim 13, wherein said device additionally includes a pumping means for moving said heat absorbing medium through said heat exchange means to absorb thermal energy stored within said device and to dispose said energy at a point beyond said device.

15. A process for the manufacture of a matrix to be utilized in solar radiation collection and thermal energy storage comprising:

(a) pulverizing a phase change material into a finely particulate state, said phase change material is selected from a group consisting of polyethylene glycol, said polyethylene glycol having a molecular weight of from about 4500 to about 20,000, pentacasone, trituacotane, camphene, myristic acid, methyl oxalate, stearic acid, and tristerin;

(b) mixing said particulate phase change material with a polymeric material to form a phase change matrix, said polymeric material is a curable liquid and selected from a group consisting of polymeric polysulfide, polymeric silicone rubber, and polymeric butyl rubber; and (c) simultaneously maintaining the temperature of mixing below the melting point of the phase change material, wherein the particulate phase change material is discretely dispersed in said polymeric material and thereby prevented from liquifying and coagulating.

16. The process of claim 15 wherein the process additionally includes:

(a) depositing said matrix within a housing reservoir;

(b) positioning a heat exchange means in said matrix, said heat exchange means being in communication with the outside of said reservoir; and (c) mounting said reservoir on a house to expose said reservoir to solar radiation in order to collect solar radiation, to convert said radiation to thermal energy and to store said energy in said matrix.

17. The process of claim 16 wherein the process additionally includes:

(a) situating a heat distribution means within said house; and (b) circulating a heat absorbing medium through said heat exchange means in said matrix to absorb said stored thermal energy in order to transfer said energy to said heat distribution means thereby heating said house.

18. The process of claim 17 wherein the polymeric material is a curable liquid polymeric material and the process additionally comprises blending a curing agent into said matrix following the mixing step, said curing agent comprising from about 1 wt% to about 10 wt% of said matrix.

19. The process of claim 18 wherein said phase change material has a melting point of from about 50° C. to about 80° C. and a latent heat of fusion greater than about 50 cal/gram.

20. The process of claim 15, wherein the ratio of polymeric material to particulate phase change material is from about 0.4:1 to about 3:1.

21. The process of claim 20, wherein said ratio of polymeric material to particulate phase change material is from about 0.7:1 to about 2:1.

22. The process of claim 21, wherein said polymeric material is polymeric polysulfide, said particulate phase change material is polyethylene glycol, and the ratio of polymeric polysulfide to polyethylene glycol is from about 1:1 to about 1.5:1.

23. The process of claim 22, wherein the polyethylene glycol has a molecular weight of about 6000.

24. The process of claim 15, wherein the process additionally includes mixing a minority of carbon black into the phase change matrix.

25. The process of claim 24, wherein the phase change matrix comprises from about 25 wt% to about 65 wt% of polymeric material, from about 3 wt% to about 10 wt% of carbon black, and from about 20 wt% to about 60 wt% of phase change material.

26. The process of claim 25, wherein the phase change matrix comprises from about 35 wt% to about 50 wt% of polymeric material, from about 5 wt% to about 8 wt% of carbon black, and from about 40 wt% to about 50 wt% of phase change material.

27. The process of claim 26, wherein the phase matrix comprises about 45 wt% of polymeric polysulfide, about 6 wt% of carbon black and about 45 wt% of polyethylene glycol, said polyethylene glycol having a molecular weight of from about 4500 to about 20,000.

28. The process of claim 27, wherein said polyethylene glycol has a molecular weight of about 6000.

29. The process of claim 16 additionally comprising positioning a cover plate over said matrix in said housing reservoir following step (b).

30. The process of claim 29 wherein said positioning is performed such that there is a space between said matrix and said cover plate.

* * * * *